(12) United States Patent
Bishop et al.

(10) Patent No.: US 6,843,516 B2
(45) Date of Patent: Jan. 18, 2005

(54) COUPLER FOR LOW PRESSURE PIPING SYSTEM

(75) Inventors: John P. Bishop, Canton, OH (US); Gregory A. Calderone, Canton, OH (US); Leland J. Dick, Medina, OH (US); James F. Smith, Louisville, OH (US)

(73) Assignee: H-P Products, Inc., Louisville, OH (US)

( * ) Notice: Subject to any disclaimer, the term of this patent is extended or adjusted under 35 U.S.C. 154(b) by 0 days.

(21) Appl. No.: 10/235,191

(22) Filed: Sep. 5, 2002

(65) Prior Publication Data

US 2004/0007875 A1 Jan. 15, 2004

Related U.S. Application Data

(60) Provisional application No. 60/396,162, filed on Feb. 15, 2002.

(51) Int. Cl.[7] .............................. F16L 21/06; F16L 15/00
(52) U.S. Cl. ....................... 285/420; 285/322; 285/382; 285/111; 277/605; 277/645; 277/626
(58) Field of Search ................................. 285/420, 322, 285/382, 111, 112; 277/605, 647, 645, 626

(56) References Cited

U.S. PATENT DOCUMENTS

| | | | | | |
|---|---|---|---|---|---|
| 692,795 | A | * | 2/1902 | Moyle | 285/81 |
| 1,541,601 | A | * | 6/1925 | Tribe | 285/112 |
| 1,607,943 | A | * | 11/1926 | Carson et al. | 285/112 |
| 1,683,076 | A | * | 9/1928 | Johnson et al. | 285/112 |
| 1,976,589 | A | * | 10/1934 | Walter | 277/626 |
| 2,259,940 | A | * | 10/1941 | Nathan | 277/626 |
| 2,301,280 | A | * | 11/1942 | Howe | 285/232 |
| 2,457,908 | A | * | 1/1949 | Meyerhoeffer | 285/7 |
| 2,702,716 | A | * | 2/1955 | Basolo et al. | 285/322 |
| 3,240,501 | A | * | 3/1966 | Smith | 277/614 |
| 3,498,649 | A | * | 3/1970 | Pfeuffer | 285/365 |
| 3,647,229 | A | * | 3/1972 | Grimes | 277/615 |
| 3,712,631 | A | * | 1/1973 | Forchini et al. | 277/605 |
| 3,874,680 | A | * | 4/1975 | Mustoe et al. | 277/405 |
| 4,113,289 | A | * | 9/1978 | Wagner et al. | 285/322 |
| 4,270,689 | A | * | 6/1981 | Canfield | 228/152 |
| 4,508,355 | A | * | 4/1985 | Ditcher | 277/605 |
| 4,536,019 | A | * | 8/1985 | Quaranta | 285/322 |
| 4,902,049 | A | * | 2/1990 | Umehara | 285/347 |
| 5,172,919 | A | * | 12/1992 | Takasaki et al. | 277/644 |
| 5,314,213 | A | * | 5/1994 | Heister et al. | 285/231 |
| 5,580,068 | A | * | 12/1996 | Gundy | 277/605 |
| 5,632,513 | A | * | 5/1997 | Cassel | 285/322 |
| 5,924,282 | A | * | 7/1999 | Thomas | 60/323 |
| 6,123,369 | A | * | 9/2000 | Wagner et al. | 285/424 |
| 6,312,021 | B1 | * | 11/2001 | Thomas | 285/253 |
| 6,508,277 | B1 | * | 1/2003 | Imes et al. | 138/135 |
| 6,719,302 | B2 | * | 4/2004 | Andrick | 277/604 |

* cited by examiner

Primary Examiner—Eric K. Nicholson
(74) Attorney, Agent, or Firm—Sand & Sebolt

(57) ABSTRACT

A coupler for a low pressure piping system has a hollow metal tube terminating in a pair of end portions defining open ends for slidably receiving and joining together sections of other metal tubes in a substantially air tight relationship. Slots are formed in at least one of the end portions to aid in the crimping of the hollow metal tube by an annular clamp. A radial flange is formed adjacent the end portion and receives an annular seal therein. A stop for limiting the insertion of a tube section into the end of the hollow metal tube is formed on the inside of the coupler adjacent the radial flange opposite the slots. The annular clamp encircles the slots and is tightened to clamp the end portions to form metal to metal contact between the metal tubes and to form a seal between the annular seal and both metal tubes.

39 Claims, 12 Drawing Sheets

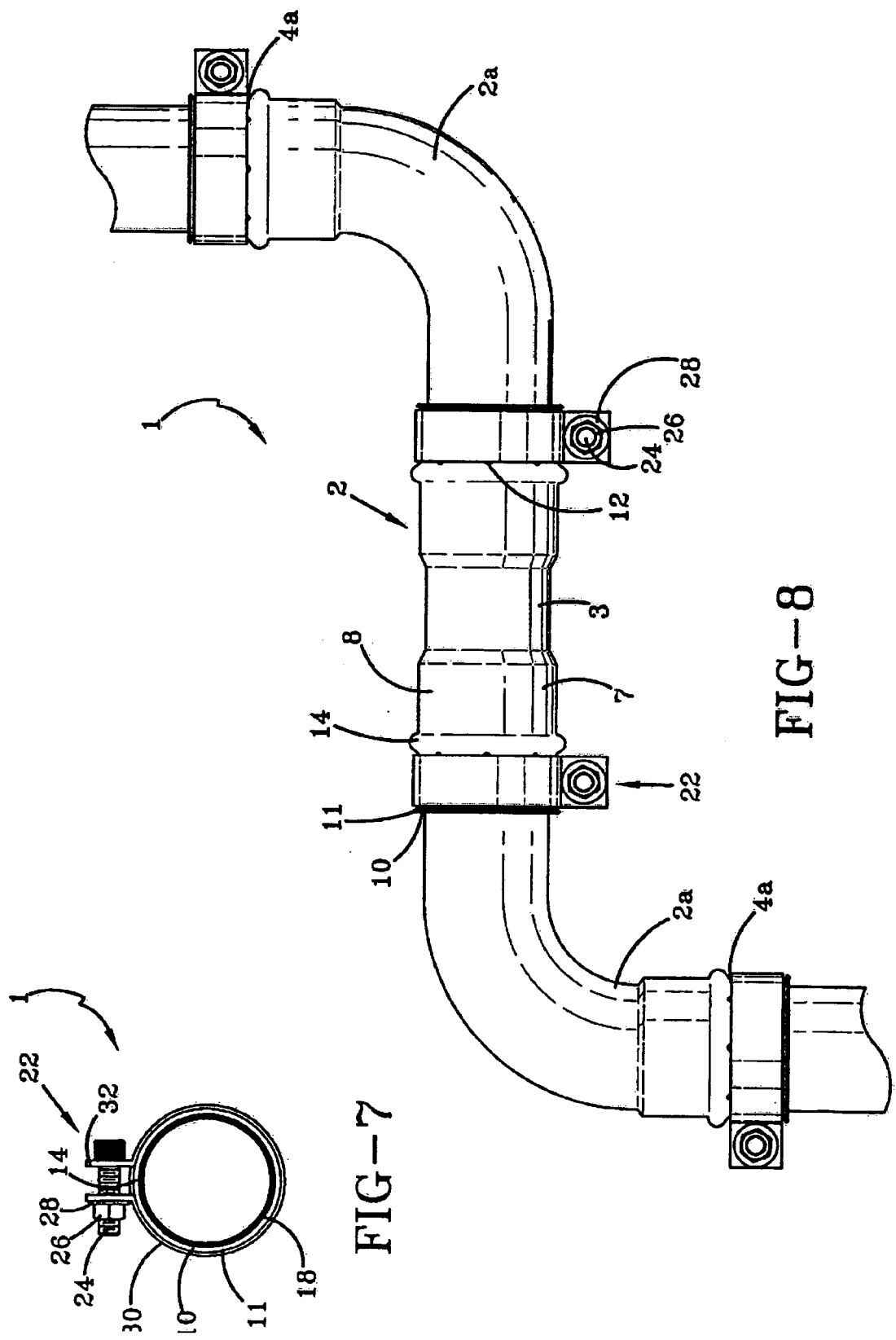

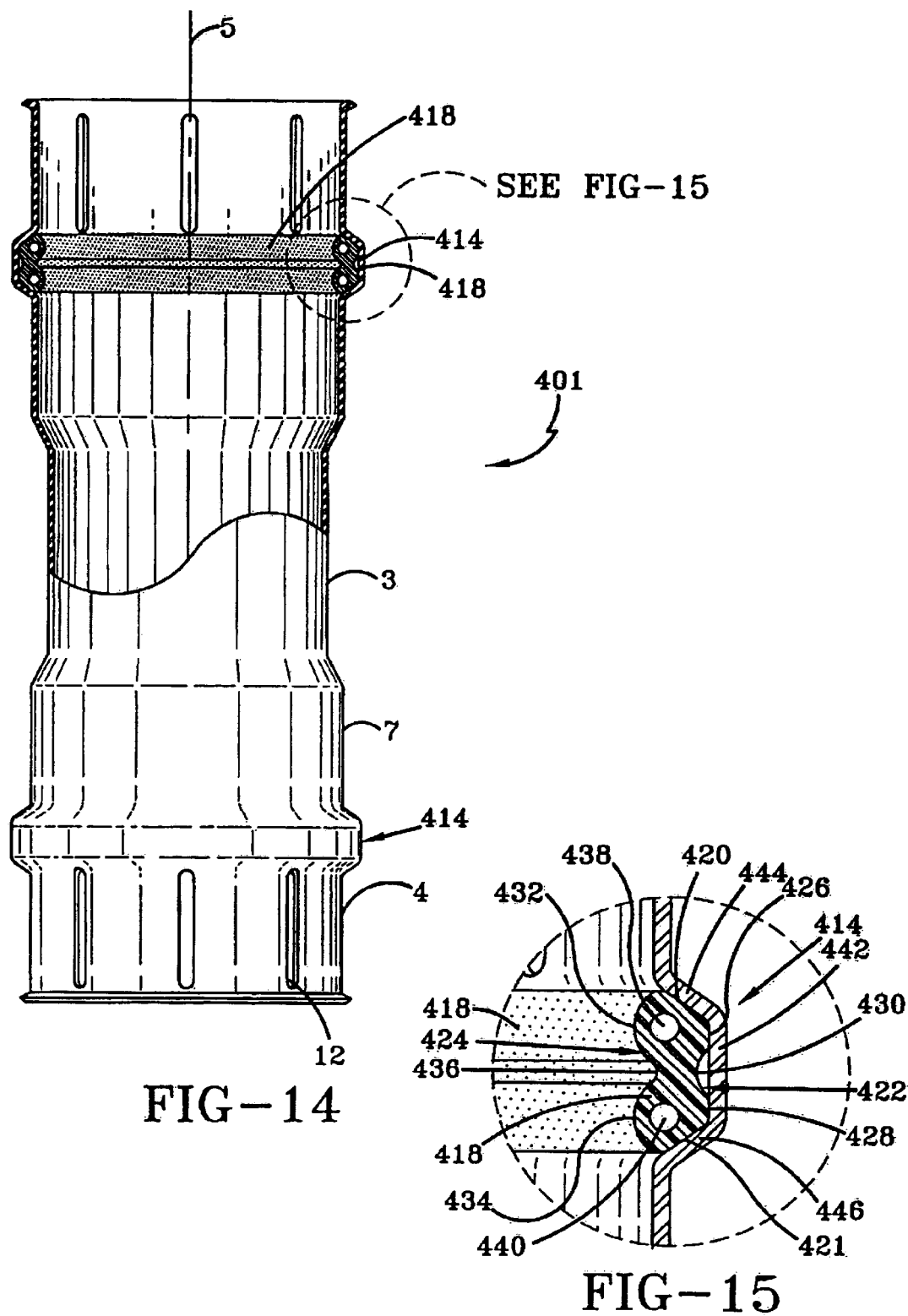

COUPLER FOR LOW PRESSURE PIPING SYSTEM

CROSS REFERENCE TO RELATED APPLICATION

This is a standard utility patent based on provisional patent Ser. No. 60/396,162 filed Jul. 15, 2002.

BACKGROUND OF THE INVENTION

1. Technical Field

The invention relates to an improved coupler for a piping system. More particularly, the invention relates to a coupler for a low pressure or vacuum piping system for transporting materials with air. Specifically, the invention relates to a coupler generally made of a hollow metal tube and configured to receive another metal tube and clamp down on the other tube to create metal to metal contact between the two tubes and a seal between the tubes, and to an improved annular seal inserted in the hollow metal tube.

2. Background Information

In the past, vacuum and pressure pipes which were used for transporting material, such as tobacco or fine dust from wood shops or flour mills, etc. have been held together with coupling systems. However, such dust has a tendency to explode. Therefore, metal straps have been used in couplings having rubber gaskets to assure that metal to metal contact exists for grounding. These metal straps add cost to the coupler and can also push seals out of place during installation. Thus, there exists a need to maintain metal to metal contact between a coupler and the joined piping without the need for separate metal grounding straps.

In high vibration areas, piping can vibrate out of a coupling, breaching the system. Thus, creating a strong clamping bond between the coupler and piping in the system is of primary concern.

In addition, a reliable and airtight seal is required under low pressure or vacuum conditions to ensure that the material flowing through the pipes does not leak out and that an effective and efficient flow is maintained. Thus, the creation of an airtight seal is important.

Also, there is a need for a coupler that is easily and quickly installed, and which reduces or eliminates the need for training for installing the coupler.

Thus, the need exists for a coupler for a low pressure piping system that is easy to install, which will maintain metal to metal contact throughout the system without the use of metal straps, which will remain intact in high vibration areas, and which will maintain an airtight seal under low pressure conditions.

BRIEF SUMMARY OF THE INVENTION

Advantages of the invention include providing a coupler for a low pressure piping system which is seamless, thus reducing the chance of leakage and increasing the coupler's strength.

A further feature of the coupler is to provide slots adjacent the open end of the coupler to facilitate the clamping of the coupler onto a tube.

Another feature of the coupler is to provide a radial flange into which is inserted an annular seal to provide an airtight seal.

Still another feature of the coupler is to provide a stop to ensure the proper amount of insertion of a metal tube into the coupler without the need for measuring or estimation.

Yet another feature of the coupler is to provide improved gripping strength between the coupler and tubes in the system by the use of metal to metal clamping.

Another feature of the coupler is to maintain metal to metal contact throughout the system for electrical grounding without the need for separate grounding straps.

Another feature is a coupler which is relatively light weight.

Yet another feature of the coupler is the ability to maintain an effectively airtight seal under low pressure or vacuum conditions.

A still further feature of the coupler is that it can be simply and quickly installed.

Another feature of the coupler is that it eliminates tightening instructions and thus reduces the need for installation training.

A further advantage is a coupler that requires only one or two bolts to be tightened to clamp the coupler to a metal tube, and each bolt need be tightened only once.

Another feature is a coupler in which one end of the coupler may be installed independently of the other end, allowing the clamping of the coupler to a metal tube prior to installation.

Yet another feature of the coupler is the use of seals situated so they will not fall out during routine handling.

Another advantage is a coupler for a low pressure piping system of simple construction, which achieves the stated features in a simple, effective and inexpensive manner, and which solves problems and satisfies needs existing in the art.

These and other features and advantages of the invention are obtained by the coupler for a low pressure piping system of the present invention, the general nature of which may be stated as including a hollow metal tube terminating in a pair of end portions, defining open ends, at least one of said end portions being formed with a plurality of slots; a radial flange formed in the tube adjacent said one end portion, said flange having an inner surface; an annular seal having an outer surface complimentary with the inner surface of said radial flange, and seated in said flange; and an annular clamp encircling the slots.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

FIG. 7 is an end view of the coupler shown in FIG. 1;

FIG. 8 is a schematic view of the coupler joining together several tube sections;

FIG. 14 is a side elevational view with portions cut away and shown in section of a fifth embodiment of the present invention;

FIG. 15 is an enlarged view of the encircled portion of FIG. 14;

Similar numerals refer to similar parts throughout the drawings.

DETAILED DESCRIPTION OF THE INVENTION

Figure 1:
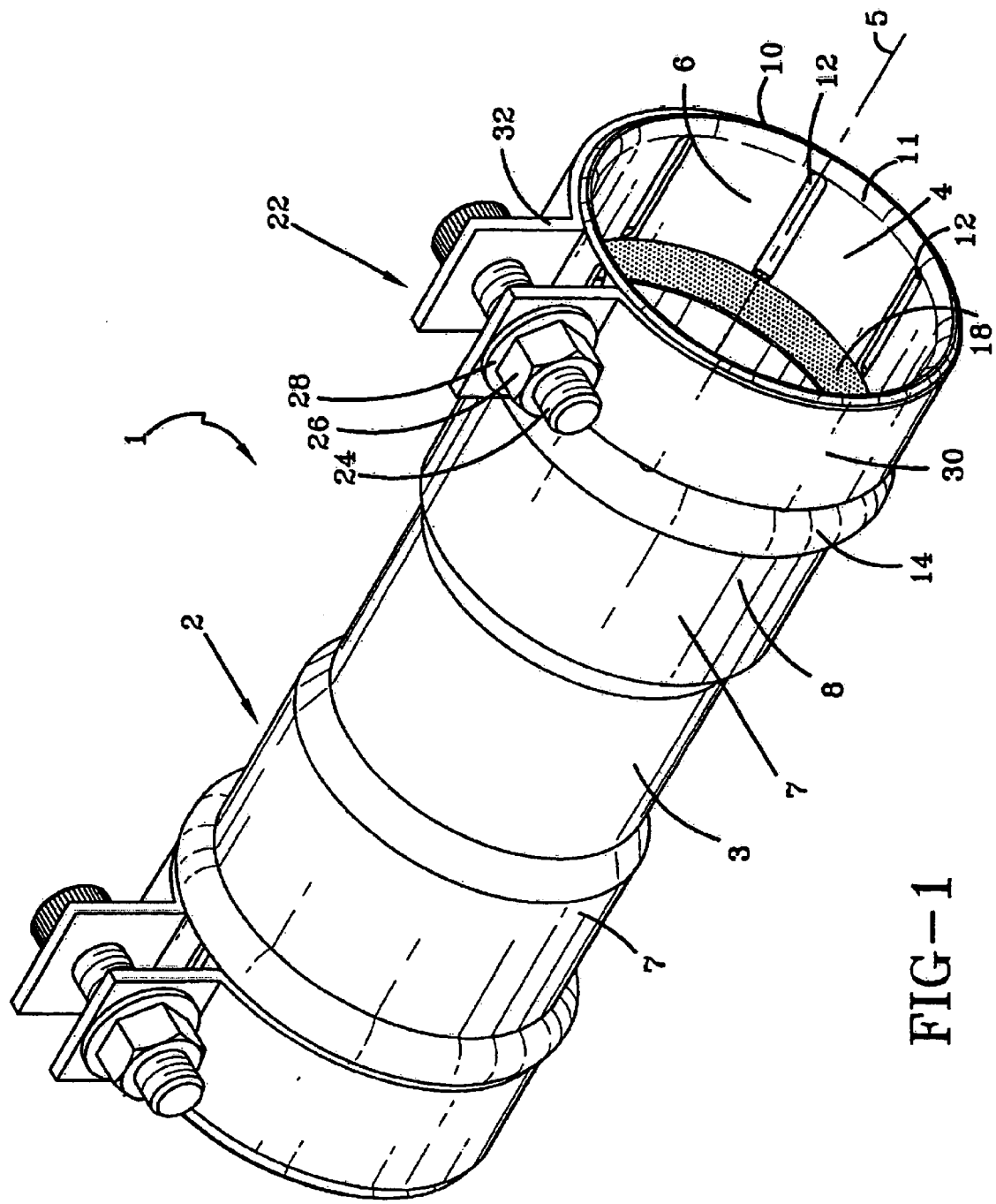
FIG. 1 is a perspective view of the coupler of the present invention.
Figure 2:
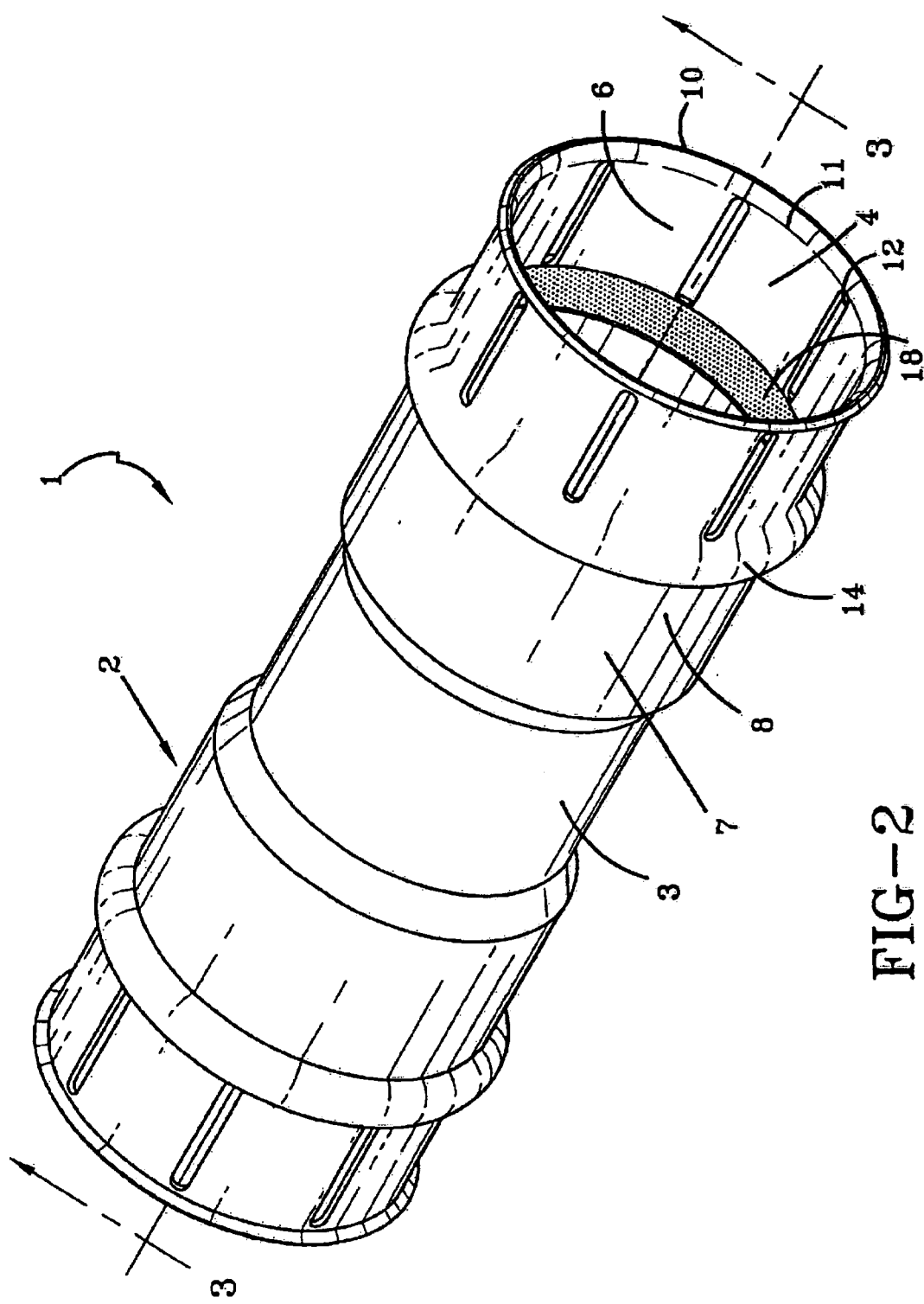
FIG. 2 is a perspective view of the coupler without the annular clamps.
Figure 3:
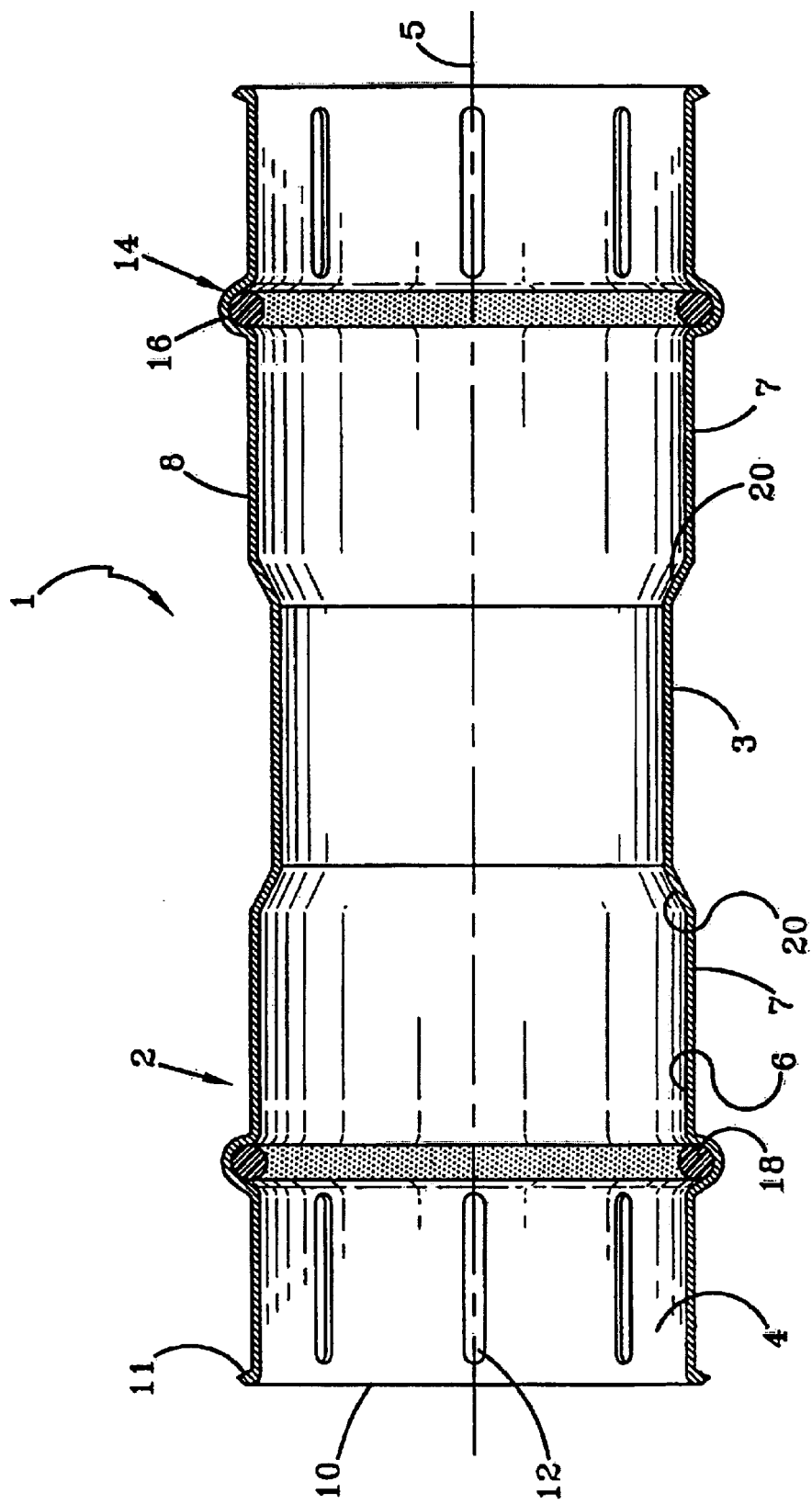
FIG. 3 is a sectional view of the coupler taken on line 3—3, FIG. 2.
Figure 4:
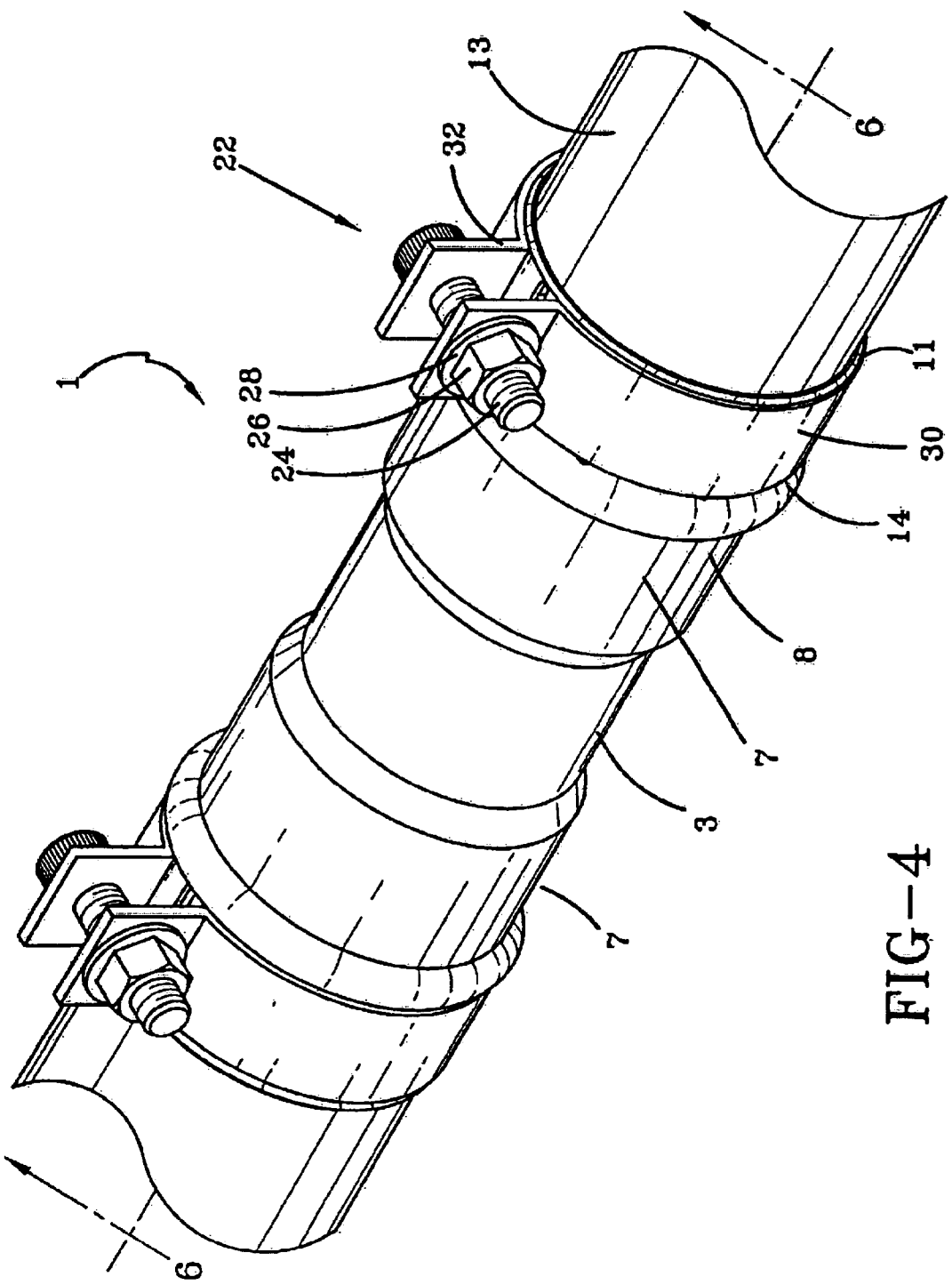
FIG. 4 is a perspective view of the coupler showing connecting tubes in fragmentary inserted in both ends thereof.
Figure 5:
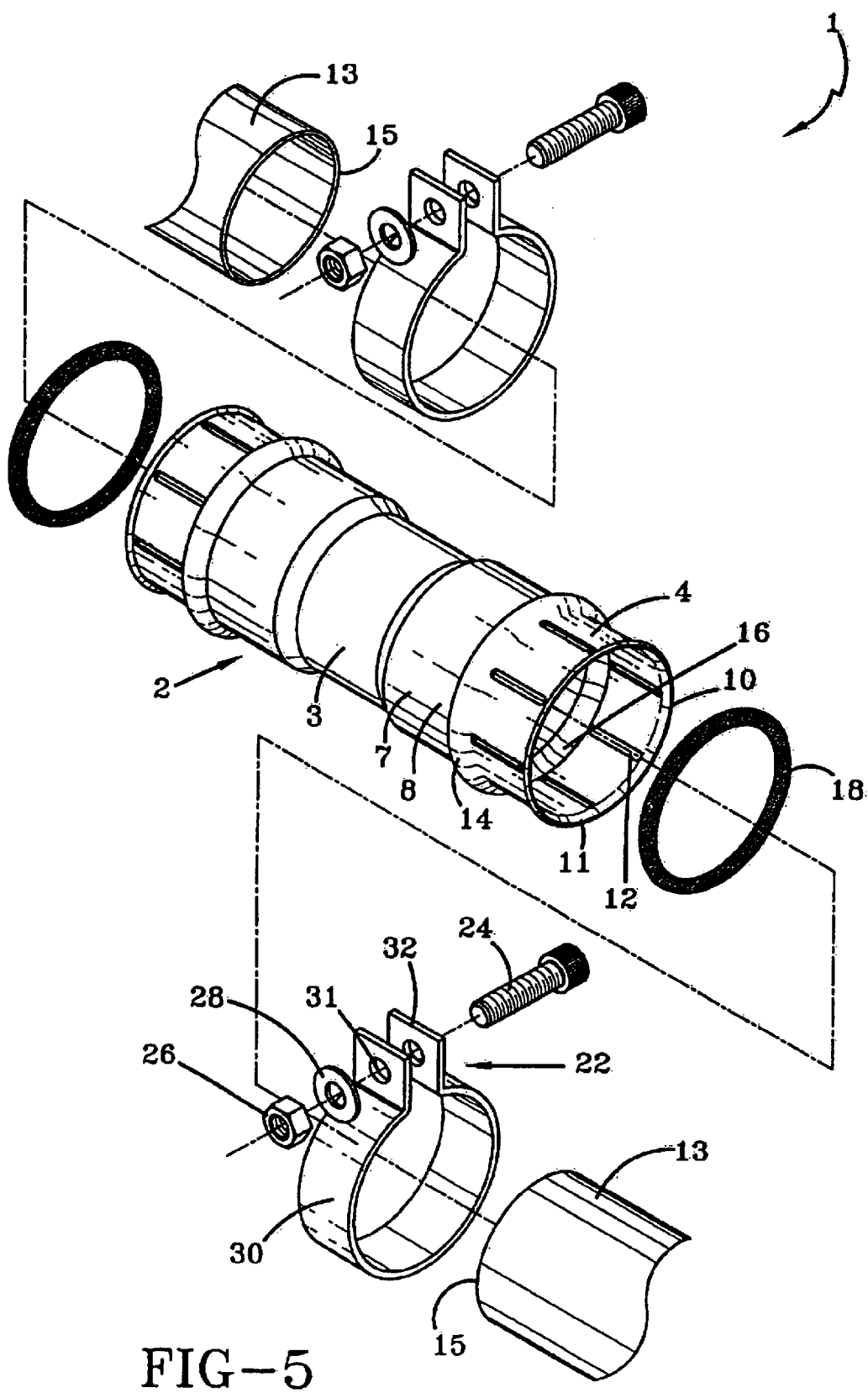
FIG. 5 is an exploded perspective view of the coupler shown in FIG. 4.
Figure 6:
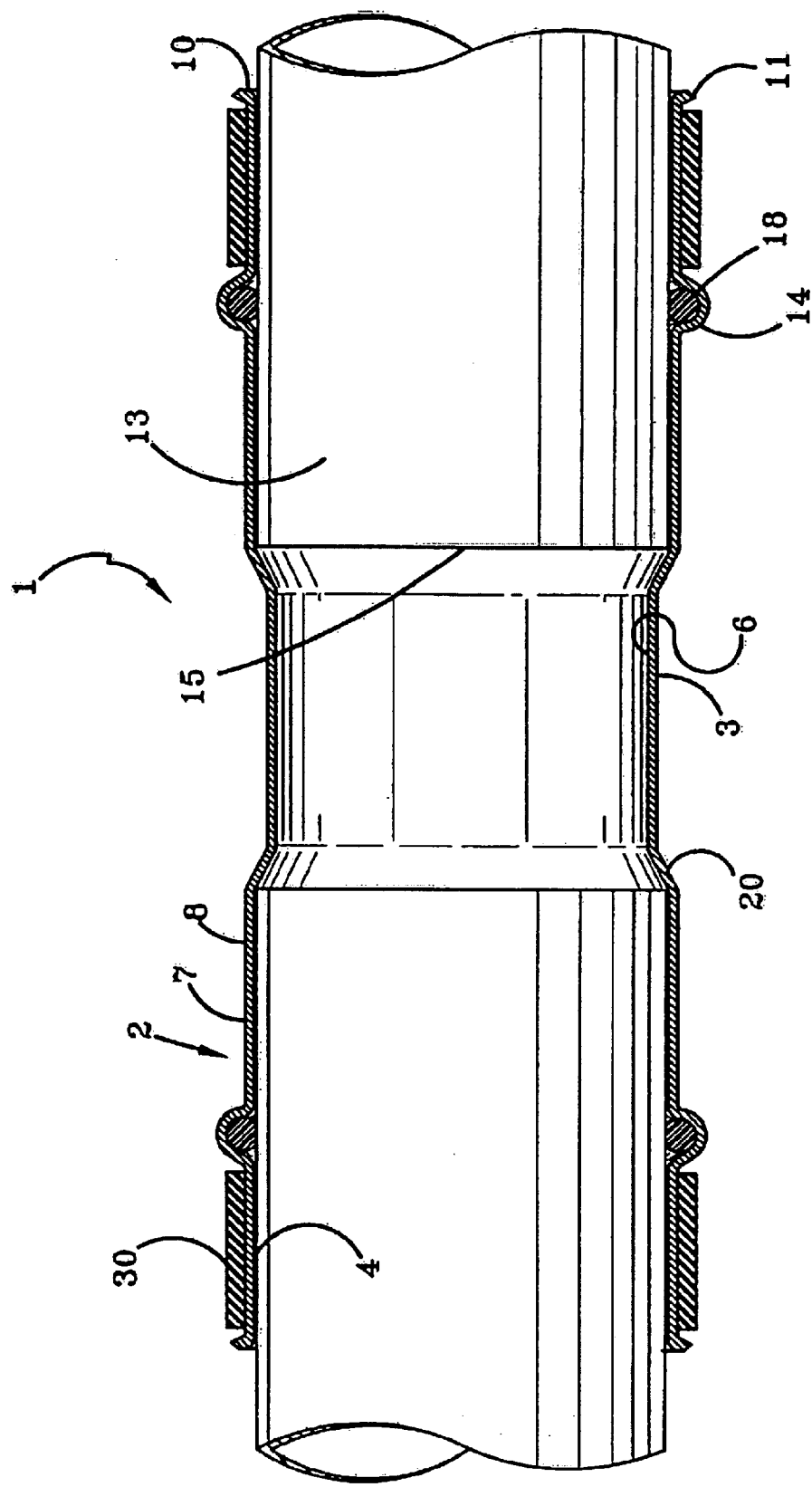
FIG. 6 is a longitudinal sectional view of the coupler taken on line 6—6, FIG. 4.

The coupler for a low pressure piping system of the present invention is indicated generally at 1, and is shown particularly in FIGS. 1–8. Coupler 1 includes a substantially cylindrical seamless metal tube 2 having end portions 4, a reduced diameter central portion 3 which is connected to end portions 4 by larger diameter portions 7. Tube 2 further includes a central longitudinal axis 5, an inner surface 6, an outer surface 8, and a pair of open ends 10 for slidably receiving sections of metal tubes 13 therein as shown in FIGS. 4 and 6. Open ends 10 preferably terminate in outwardly flared peripheral edges 11. A plurality of circumferentially spaced slots 12 are formed in end portions 4 adjacent open ends 10. An outwardly extending radial flange 14 (FIG. 3) is formed between each end portion 4 and each larger diameter portion 7 and has a generally U-shaped inner surface 16. Slots 12 are elongated and extend parallel to axis 5 from adjacent open ends 10 partially into radial flanges 14. An elastomeric annular seal 18, such as a rubber O-ring, is seated in each U-shaped surface 16 of radial flange 14. Stops 20 (FIG. 3) are formed on inner surface 6 of tube 2 at the junctions between reduced diameter center portions 3 and adjacent tube portions 7.

An annular clamp, indicated generally at 22, is mounted on each end portion 4 and encircles slots 12. Each clamp 22 includes a threaded bolt 24, a threaded nut 26, a washer 28 and an annular band 30. Band 30 is formed from substantially flat sheet metal and terminates in outwardly extending opposed and spaced tabs 32 which have aligned holes 31 formed therein for receiving bolt 24. Band 30 has a width extending substantially from radial flange 14 to flared edge 11 of end portion 4 and substantially covers slots 12.

Coupler 1 is configured to link sections of metal tubes 13 in a low pressure piping system, as shown in FIGS. 4, 5, 6 and 8. Each metal tube 13 is inserted into open end 10 until an end 15 of metal tube 13 rests against stop 20. Stop 20 ensures that metal tube 13 is inserted beyond annular seal 18 and ensures that the correct amount of overlap exists between the coupler and tube sections. Slots 12 facilitate the crimping of tube 2 when bolt 24 and nut 26 are screwed together to tighten annular clamp 22, which holds tubes 2 and 13 firmly together. The tightening of annular clamp 22 serves two further purposes. First, an airtight seal is formed between seal 18 and tubes 2 and 13 under low pressure conditions. Second, metal-to-metal contact is created between metal tubes 2 and 13, which contact creates an effective ground for any electrical current or static electricity generated by the materials moving through the tubes and couplers.

It will be appreciated that the various structures creating the coupling function can be included in only one end of tube 2. That is, only one end of tube 2 need include end portion 4, radial flange 14, seal 18, stop 20 and clamp 22. Thus, the scope of the invention encompasses coupler 1 wherein a metal tube 13 can be inserted into each open end 10 and also encompasses a coupler in which only one open end receives a metal tube 13 while the other end itself can be inserted into the open end of another coupler. FIG. 8 shows coupler 1 one linked to a pair of the latter type of coupler, which in this case also include arcuate tubes 2A. FIG. 8 shows the arcuate tubes having end portions 4A on one end only. Further, the invention contemplates a more complex metal tube that may be branched, such as a Y-shaped metal tubing, wherein there are more than two ends, any or all of which could be configured to function as a coupler.

It will be further appreciated that annular seal 18 could be formed of a suitable material other than rubber. Also, coupler 1 will function without stop 20, although stop 20 is helpful in facilitating installation of a piping system. Stop 20 may have various configurations, such as dimples or a radial flange extending inwardly from inner surface 6 of tube 2 or other suitable configurations. Clamp 22 can also have various configurations which may not include a threaded bolt and threaded nut.

Figure 9:
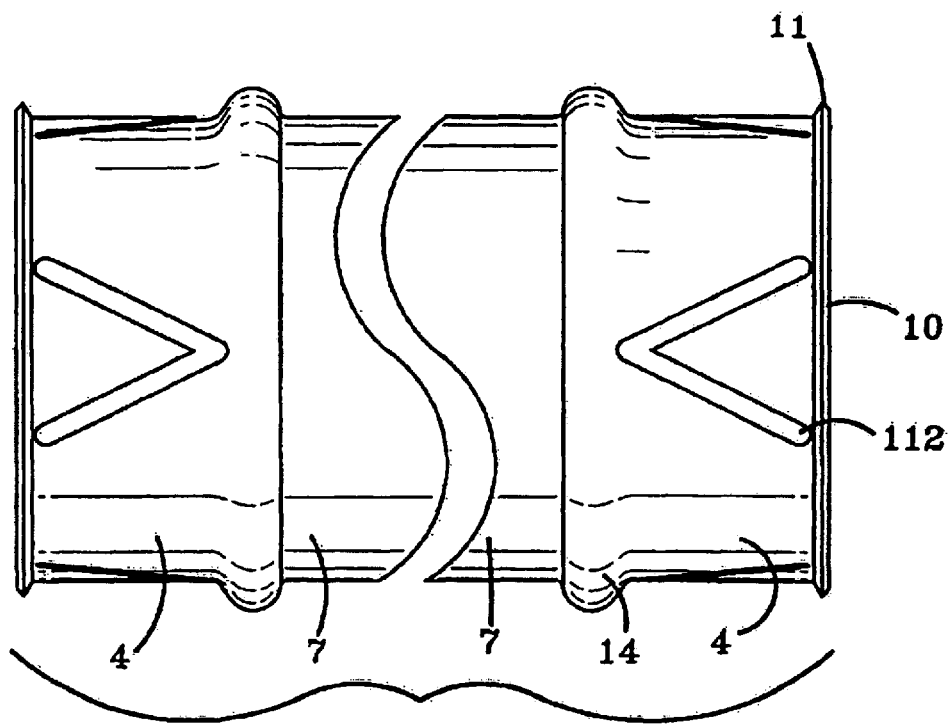
FIG. 9 is a fragmentary top plan view of a second embodiment of the present invention.
Figure 10:
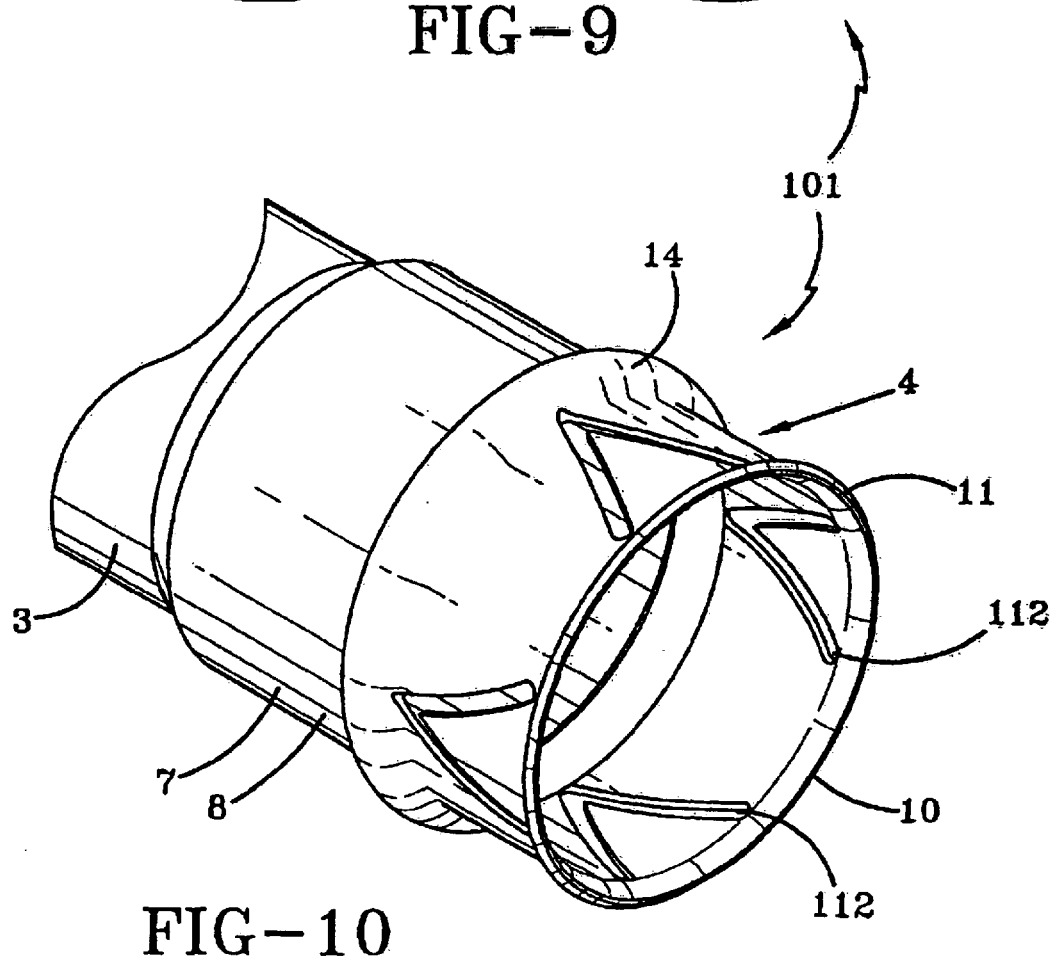
FIG. 10 is a fragmentary perspective view of the embodiment shown in FIG. 9.

A second embodiment of the present invention is shown in FIGS. 9–10 and includes a coupler 101. Coupler 101 is similar to coupler 1 in many respects, except that V-shaped slots 112 replace elongated slots 12. Slots 112 have the point of the V facing away from end 10 and toward radial flange 14.

Figure 11:
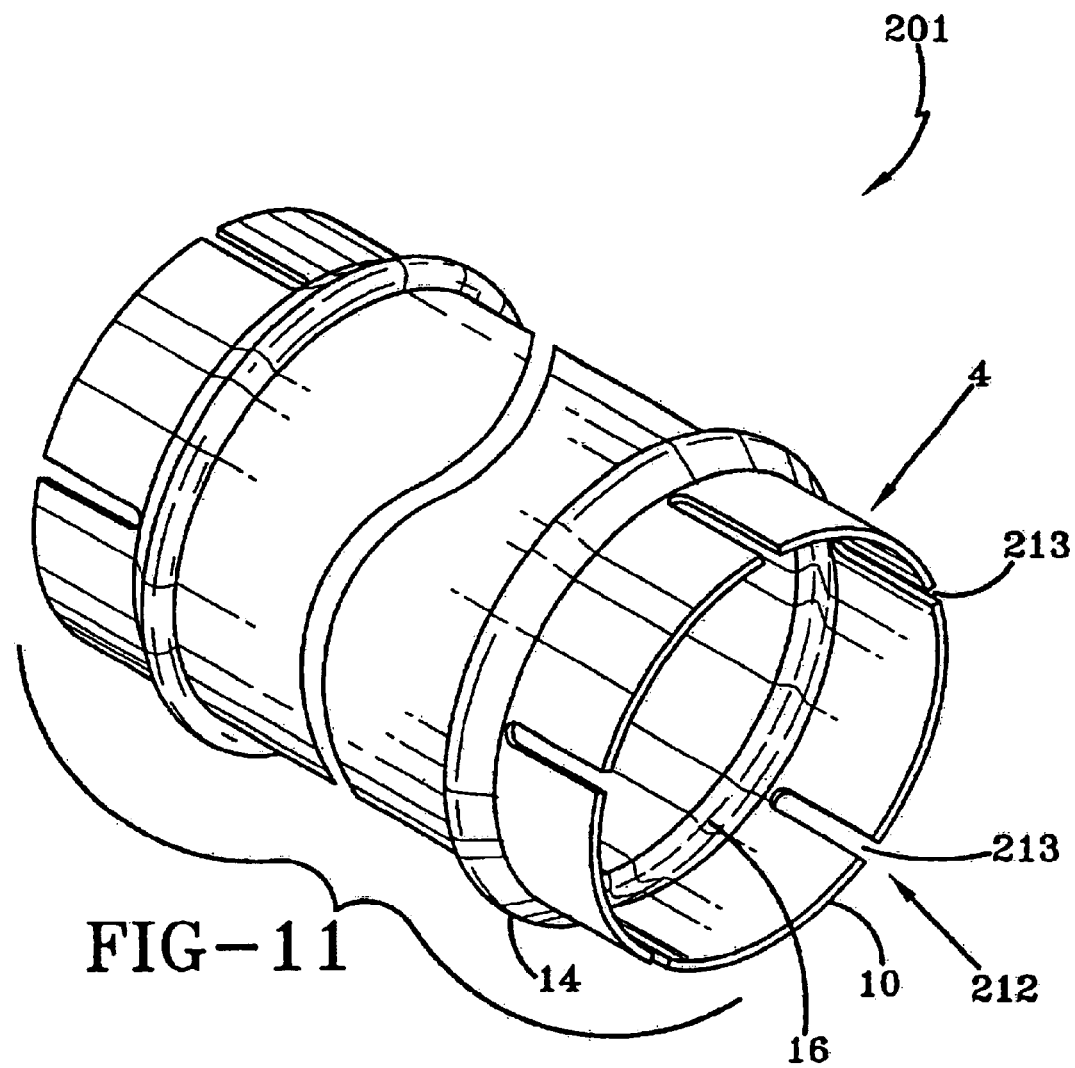
FIG. 11 is a fragmentary perspective view of a third embodiment of the present invention.

A third embodiment of the present invention is shown in FIG. 11 and includes a coupler 201. Coupler 201 is similar to coupler 1, except there is no flared peripheral edge 11 defining open end 10, and slots 212 have open ends 213 that communicates with open end 10 and do not extend into radial flange 14.

Figures 12, 13:
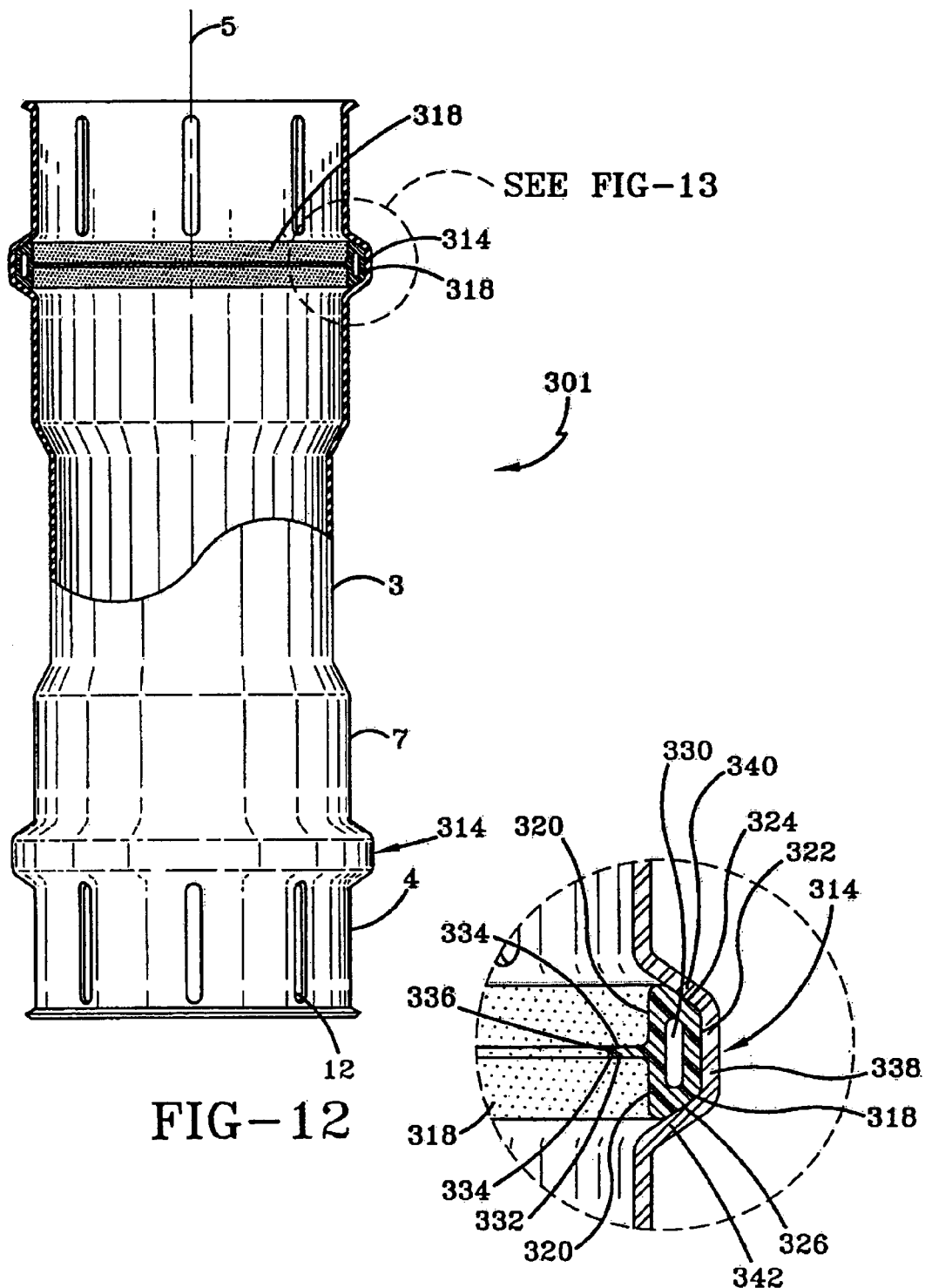
FIG. 12 is a side elevational view with portions cut away and shown in section of a fourth embodiment of the present invention.
FIG. 13 is an enlarged view of the encircled portion of FIG. 12.

A fourth embodiment of the present invention is shown in FIGS. 12–13 and includes a modified coupler 301. Coupler 301 is similar to coupler 1, except that it has a modified radial flange 314 and annular seal 318. Annular seal 318 in cross-section is substantially trapezoidal, having a long parallel side 320 and a short parallel side 322, and a pair of tapered sides 324 and 326. Sides 320 and 322 extend parallel to axis 5 when seated within a complementary shaped interior of flange 314. Seal 318 has a hollow interior 330 and includes a blade 332 which extends medially and perpendicularly from long parallel side 320 inwardly therefrom. Blade 332 has elongated parallel sides 334 which extend perpendicularly from side 320 and has a flat terminal short edge 336 which is parallel to side 320 (FIG. 13).

Radial flange 314 is generally U-shaped in cross section and has a bottom 338 and a pair of tapered sides 340 and 342. Bottom 338 is parallel to axis 5, and sides 340 and 342 extend obliquely from bottom 338.

A fifth embodiment of the present invention is shown in FIGS. 14–15 and includes a modified coupler 401. Coupler 401 is similar to coupler 1, except that it has a modified radial flange 414 and annular seal 418.

Annular seal 418 in cross section is generally W-shaped and has a pair of tapered sides 420 and 421, and outer and inner surfaces 422 and 424, respectively. Outer surface 422 has a pair of flat portions 426 and 428 each communicating with an intermediate concavity 430. Flat portions 426 and 428 each communicate with one of tapered sides 420 and 421 and extend parallel to axis 5 when seated within an interior of flange 414. The interior of flange 414 is complementary with tapered sides 420 and 421 and flat portions 426 and 428. Inner surface 424 has a pair of rounded portions 432 and 434 each communicating with an intermediate concavity 436 and with one of tapered sides 420 and 421. Each surface 432 and 434 is generally opposite one of the flat portions 426 and 428. Intermediate concavity 430 is generally opposite intermediate concavity 436. A pair of hollow interiors 438 and 440 are formed in seal 418, each of said hollows interior being adjacent one of the rounded portions 432 and 434.

Radial flange 414, like radial flange 314, is generally U-shaped in cross section and has a bottom 442 and a pair of tapered sides 444 and 446, with bottom 442 being parallel to axis 5, with sides 444 and 446 extending obliquely from bottom 442.

Figures 16, 17:
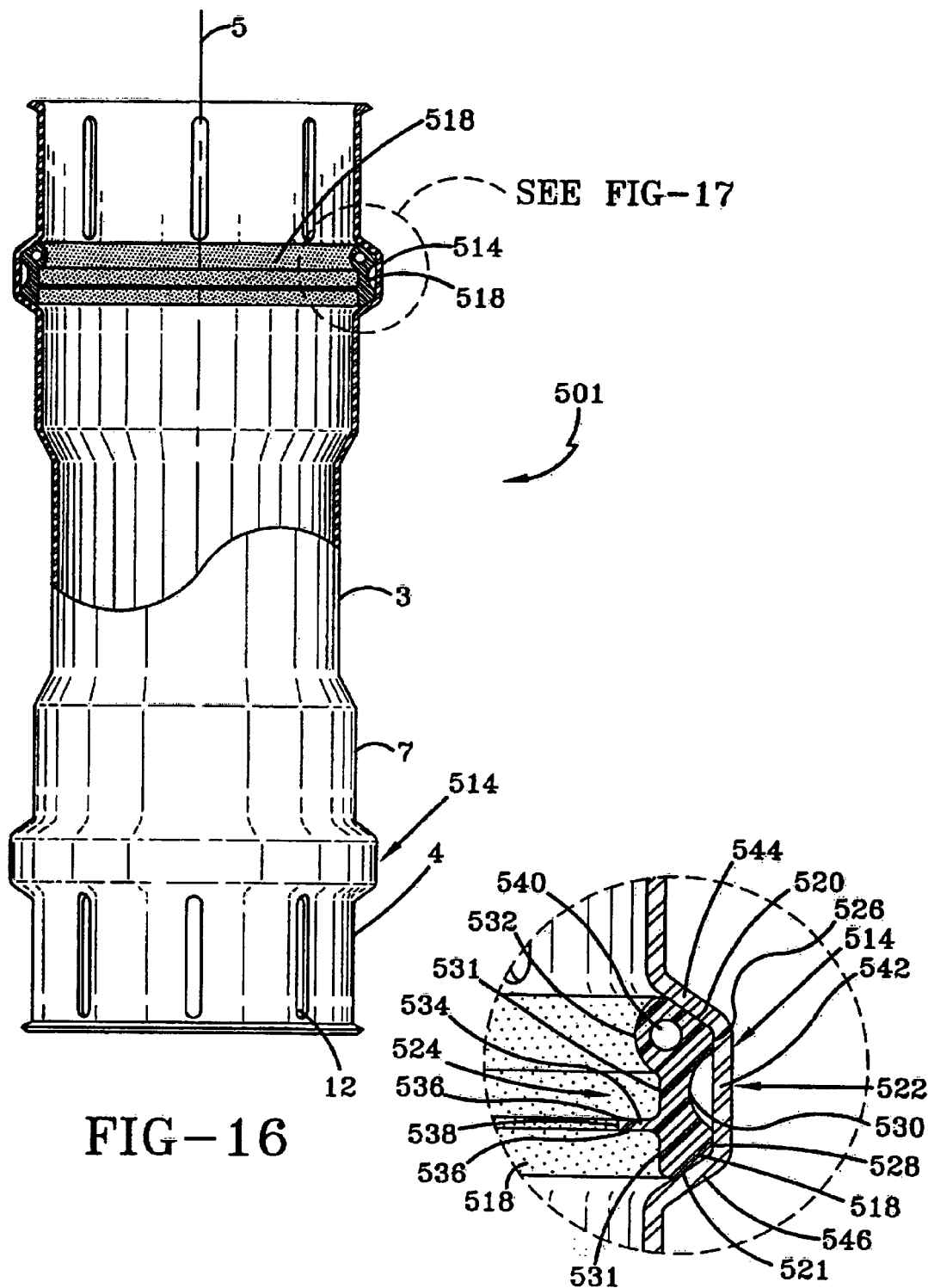
FIG. 16 is a side elevational view with portions cut away and shown in section of a sixth embodiment of the present invention.
FIG. 17 is an enlarged view of the encircled portion of FIG. 16.

A sixth embodiment of the present invention is shown in FIGS. 16–17 and includes modified coupler 501. Coupler 501 is similar to coupler 1, except that it has a modified radial flange 514 and annular seal 518.

Annular seal 518 is a hybrid of annular seals 318 and 418. Annular seal 518 in cross section is generally W-shaped and has a pair of tapered sides 520 and 521, an outer surface 522, and an inner surface 524. Surface 522 has a pair of flat portions 526 and 528 each communicating with an intermediate concavity 530. Flat portions 526 and 528 each communicate with one of tapered sides 520 and 521 and extend parallel to axis 5 when seated within an interior of flange 514, said interior being complementary with tapered sides 520 and 521 and flat portions 526 and 528. Inner surface 524 has a flat portion 531 and a rounded portion 532 which communicates with tapered side 520 and flat portion 531. Rounded portion 532 is generally opposite flat portion 526 and flat portion 531 extends parallel to axis 5 when seated within the interior of flange 514. A blade 534 extends perpendicularly inwardly from flat portion 531. Blade 534 has elongated parallel sides 536 which extend perpendicularly from flat portion 531 and has a flat terminal short edge 538 which is parallel to flat portion 531 (FIG. 17). Seal 518 has a hollow interior 540 adjacent convexity 532.

Radial flange 514, like radial flanges 314 and 414, is generally U-shaped in cross section and has a bottom 542 and a pair of tapered sides 544 and 546. Bottom 542 is parallel to axis 5, and sides 544 and 546 extend obliquely from bottom 542.

As described herein, the coupler of the present invention is simplified, provides an effective, safe, inexpensive, and efficient device which achieves all the enumerated features and advantages, provides for eliminating difficulties encountered with prior devices, and solves problems and obtains new results in the art.

In the foregoing description, certain terms have been used for brevity, clearness and understanding, but no unnecessary limitations are to be implied therefrom beyond the requirement of the prior art, because such terms are used for descriptive purposes and are intended to be broadly construed. Moreover, the description and illustration of the invention is by way of example, and the scope of the invention is not limited to the exact details shown or described.

Having now described the features, discoveries and principles of the invention, the manner in which the coupler is constructed and used, the characteristics of the construction, and the advantageous, new and useful results obtained; the new and useful structures, devices, elements, arrangements, parts and combinations are set forth in the appended claims.

What is claimed is:

1. A coupler for a low pressure piping system, said coupler comprising:

a hollow metal tube having an inner surface and terminating in a pair of end portions, defining open ends, at least one of said end portions being formed with a plurality of V-shaped slots; each V-shaped slot having a pair of arms which intersect at a point; the slot being free of any other extension from the point;

a radial flange formed in the tube adjacent said one end portion, said flange having an inner surface;

an annular seal having an outer surface complementary with the inner surface of the radial flange, and seated in said flange; and an annular clamp encircling the slots.

2. The coupler of claim 1, wherein the annular seal in cross section is substantially trapezoid and has a long parallel side, a short parallel side, a pair of tapered sides and at least one blade extending from the long parallel side of the seal toward a central axis of the tube.

3. The coupler of claim 1, wherein the annular seal is generally W-shaped in cross section and has a bottom, a top and a pair of tapered sides; the bottom including a pair of flat portions and an intermediate concavity, each flat portion communicating with the intermediate concavity and one of the tapered sides; and the top including a pair of rounded portions and an intermediate concavity, each rounded portion communicating with the intermediate concavity of the top and with one of the tapered sides.

4. The coupler of claim 1 wherein the slots extend partially into the radial flange in which the annular seal is seated.

5. A coupler for a low pressure piping stem, said coupler comprising:

a hollow metal tube having an inner surface and terminating in a pair of end portions, defining open ends, at least one of said end portions being formed with a plurality of slots;

a radial flange formed in the tube adjacent said one end portion, said flange having an inner surface;

an annular seal having an outer surface complementary with the inner surface of the radial flange, and seated in said flange;

the slots extending partially into the radial flange in which the annular seal is seated; and an annular clamp encircling the slots.

6. A method of using a coupler for a low pressure piping system comprising the steps of:

providing a coupler with a hollow metal tube having a inner surface and terminating in a pair of end portions, defining open ends, at least one of said end portions being formed with a plurality of V-shaped slots; each shaped slot having a pair of arms which intersect at a point; the slot being free of any other extension from the point; a radial flange formed in the tube adjacent said one end portion, said flange having an inner surface; an annular seal having an outer surface complimentary with the inner surface of said radial flange, and seated in said flange; and an annular clamp encircling the slots;

providing a second metal tube with an end;

inserting a section of the second metal tube into the open end of the coupler so that the end of the second metal tube is situated adjacent the annular seal opposite the slots; and tightening the clamp.

7. The method of claim 6 in which a stop is formed on the inner surface of the hollow metal tube adjacent the radial flange opposite the slots; and in which the inserting step further includes inserting the end of the second metal tube until the end rests against the stop.

8. The method of claim 6 in which the tightening step further includes forming, under low pressure conditions, an airtight seal between the annular seal and both metal tubes.

9. The method of claim 6 in which the tightening step further includes creating metal to metal contact between the metal tubes.

10. The method of claim 6 in which the tightening step is by means of a threaded bolt and threaded nut.

11. A coupler for a low pressure piping system, said coupler comprising:

a hollow metal tube having an inner surface and terminating in a pair of end portions, defining open ends, at least one of said end portions being formed with a plurality of V-shaped slots;

a radial flange formed in the tube adjacent said one end portion, said flange having an inner surface;

the V-shaped slots having points facing away from the open end of the said one end portion and toward the radial flange;

an annular seal having an outer surface complementary with the inner surface of the radial flange, and seated in said flange; and an annular clamp encircling the slots.

12. The coupler of claim 11 wherein the slots extend partially into the radial flange in which the annular seal is seated.

13. The coupler as defined in claim 12 in which a stop is formed on the inner surface of the tube adjacent the radial flange opposite the slots.

14. A coupler for a low pressure piping system, said coupler comprising:

a hollow metal tube having an inner surface and terminating in a pair of end portions, defining open ends, at least one of said end portions being formed with a plurality of slots;

a radial flange formed in the tube adjacent said one end portion, said flange having an inner surface;

an annular seal having an outer surface complementary with the inner surface of the radial flange, and seated in said flange; the annular seal in cross section being substantially trapezoidal and having a long parallel side, a short parallel side, and a pair of tapered sides;

at least one blade extending from the tong parallel side of the seal toward a central axis of the tube; and an annular clamp encircling the slots.

15. The coupler as defined in claim 14 which the at least one blade extends perpendicularly toward a central axis of the tube.

16. The coupler as defined in claim 15 in which the short and long parallel sides are parallel to a central axis of the tube when seated within a complementary shaped interior of the radial flange.

17. The coupler as defined in claim 16 in which the annular seal has a hollow interior.

18. The coupler of claim 14 wherein the slots extend partially into the radial flange in which the annular seal is seated.

19. A coupler for a low pressure piping system, said coupler comprising:

a hollow metal tube having an inner surface and terminating in a pair of end portions, defining open ends, at least one of said end portions being formed with a plurality of slots;

a radial flange formed in the tube adjacent said one end portion, said flange having an inner surface;

an annular seal having an outer surface complementary with the inner surface of the radial flange, and seated in said flange; the annular seal in cross section being substantially trapezoidal and having a long parallel side, a short parallel side, and a pair of tapered sides; the annular seal having a hollow interior which is completely enclosed by the seal; and an annular clamp encircling the slots.

20. The coupler as defined in claim 18 in which the hollow interior is elongated in cross section.

21. A coupler for a low pressure piping system, said coupler comprising:

a hollow metal tube having an inner surface and terminating in a pair of end portions, defining open ends, at least one of paid end portions being formed with a plurality of slots;

a radial flange formed in the tube adjacent said one end portion, said flange having an inner surface;

an annular seal having an outer surface complementary with the inner surface of the radial flange, and seated in said flange; the annular seal being generally W-shaped in cross section and having a bottom, top and a pair of tapered sides; the bottom being narrower than the top; including a pair of rounded portions and an intermediate concavity, each rounded portion communicating with the intermediate concavity and with one of the tapered sides; and an annular clamp encircling the slots.

22. The coupler as defined in claim 21 which at least one hollow interior is formed in the seal adjacent each rounded portion.

23. The coupler as defined in claim 22 in which the least one hollow interior is completely enclosed by the seal.

24. The coupler of claim 21 in which the annular seal is formed of an elastomeric material.

25. A coupler for a low pressure piping system, said coupler comprising:

a hollow metal tube having an inner surface and terminating in a pair of end portions, defining open ends, at least one of said end portions being formed with a plurality of slots;

a radial flange formed in the tube adjacent said one end portion, said flange having an inner surface;

an annular seal having an outer surface complementary with the inner surface of the radial flange, and seated in said flange; the annular seal being generally W-shaped in cross section and having a bottom, top and a pair of tapered sides; the bottom including a pair of flat portions and an intermediate concavity, each flat portion communicating with the intermediate concavity and one of the tapered sides; the seal defining a completely enclosed hollow interior adjacent each tapered side; and an annular clamp encircling the slots.

26. A coupler for a low pressure piping system, said coupler comprising:

a hollow metal tube having an inner surface and terminating in a pair of end portions, defining open ends, at least one of said end portions being formed with a plurality of slots:

a radial flange formed in the tube adjacent said one end portion, said flange having an inner surface;

an annular seal having an outer surface complementary with the inner surface of the radial flange, and seated in said flange; the annular seal being generally W-shaped in cross section and having a bottom, top and a pair of tapered sides; the bottom including a pair of flat portions and an intermediate concavity, each flat portion communicating with the intermediate concavity and one of the tapered sides; the top including a pair of rounded portions and an intermediate concavity, each rounded portion communicating with the intermediate concavity of the top and with one of the tapered sides; and an annular clamp encircling the slots.

27. The coupler of claim 26 wherein the slots extend partially into the radial flange in which the annular seal is seated.

28. A coupler for a low pressure piping system, said coupler comprising:

a hollow metal tube having an inner surface and terminating in a pair of end portions, defining open ends, at least one of said end portions being formed with a plurality of slots;

a radial flange formed in the tube adjacent said one end portion, said flange having an inner surface;

an annular seal having an outer surface complementary with the inner surface of the radial flange, and seated in said flange; the annular seal being generally W-shaped in cross section and having a bottom, top and a pair of tapered sides; the bottom including a pair of flat portions and an intermediate concavity, each flat portion communicating with the intermediate concavity and one of the tapered sides; the top including a pair of rounded portions and an intermediate concavity, each rounded portion communicating with the intermediate concavity of the bottom and with one of the tapered sides; and an annular clamp encircling the slots.

29. A coupler for a low pressure piping system, said coupler comprising:

a hollow metal tube having an inner surface and terminating in a pair of end portions, defining open ends, at least one of said end portions being formed with a plurality of slots;

a radial flange formed in the tube adjacent said one end portion, said flange having an inner surface;

an annular seal having an outer surface complementary with the inner surface of the radial flange, and seated in said flange; the annular seal being generally W-shaped in cross section and having a bottom, top and a pair of tapered sides; the top including at least one convexity and at least one flat portion in communication with one another, and at least one blade extending from the flat portion toward a central axis of the tube; and an annular clamp encircling the slots.

30. The coupler as defined in claim 29 in which at least one hollow interior is formed in the seal adjacent the at least one convexity.

31. The coupler as defined in claim 29 in which the at least one blade extends perpendicularly toward a central axis of the tube.

32. The coupler as defined in claim 31 in which the flat portion is parallel to the central axis of the tube when seated within a complementary shaped interior of the radial flange.

33. The coupler as defined in claim 32 which at least one hollow interior is formed in the seal adjacent the at least one convexity.

34. The coupler of claim 29 wherein the slots extend partially into the radial flange in which the annular seal is seated.

35. A method of using a coupler for a low pressure piping system comprising the steps of:

providing a coupler with a hollow metal tube having a inner surface and terminating in a pair of end portions, defining open ends, at least one of said end portions being formed with a plurality of V-shaped slots; a radial flange formed in the tube adjacent said one end portion, said flange having an inner surface; the V-shaped slots having points facing away from the open end of the said one end portion and toward the radial flange; an annular seal having an outer surface complementary with the inner surface of the radial flange, and seated in said flange; and an annular clamp encircling the slots;

providing a second metal tube with an end;

inserting a section of the second metal tube into the open end of the coupler so that the end of the second metal tube is situated adjacent the annular seal opposite the slots; and tightening the clamp.

36. A method of using a coupler for a low pressure piping system comprising the steps of:

providing a coupler with a hollow metal tube having a inner surface and terminating in a pair of end portions, defining open ends, at least one of said end portions being formed with a plurality of slots; a radial flange formed in the tube adjacent said one end portion, said flange having an inner surface; an annular seal having an outer surface complementary with the inner surface of the radial flange, and seated in said flange; the annular seal in cross section being substantially trapezoidal and having a long parallel side, a short parallel side, and a pair of tapered sides; at least one blade extending from the long parallel side of the seal toward a central axis of the tube; and an annular clamp encircling the slots;

providing a second metal tube with an end;

inserting a section of the second metal tube into the open end of the coupler so that the end of the second metal tube is situated adjacent the annular seal opposite the slots; and tightening the clamp.

37. A method of using a coupler for a low pressure piping system comprising the steps of:

providing a coupler with a hollow metal tube having an inner surface and terminating in a pair of end portions, defining open ends, at least one of said end portions being formed with a plurality of slots; a radial flange formed in the tube adjacent said one end portion, said flange having an inner surface; an annular seal having an outer surface complementary with the inner surface of the radial flange, and seated in said flange; the annular seal in cross section being substantially trapezoidal and having a long parallel side, a short parallel side, and a pair of tapered sides; the annular seal having a hollow interior which is completely enclosed by the seal; and an annular clamp encircling the slots;

providing a second metal tube with an end;

inserting a section of the second metal tube into the open end of the coupler so that the end of the second metal tube is situated adjacent the annular seal opposite the slots; and tightening the clamp.

38. A method of using a coupler for a low pressure piping system comprising the steps of:

providing a coupler with a hollow metal tube having a inner surface and terminating in a pair of end portions, defining open ends, at least one of said end portions being formed with a plurality of slots; a radial flange formed in the tube adjacent said one end portion, said flange having an inner surface; an annular seal having an outer surface complementary with the inner surface of the radial flange, and seated in said flange; the annular seal being generally W-shaped in cross section and having a bottom, a top and a pair of tapered sides; the top including a pair of rounded portions and an intermediate concavity, each rounded portion communicating with the intermediate concavity and with one of the tapered sides; the seal defining a completely enclosed hollow interior adjacent each rounded portion; and an annular clamp encircling the slots;

providing a second metal tube with an end;

inserting a section of the second metal tube into the open end of the coupler so that the end of the second metal tube is situated adjacent the annular seal opposite the slots; and tightening the clamp.

39. A method of using a coupler for a low pressure piping system comprising the steps of:

providing a coupler with a hollow metal tube having a inner surface and terminating in a pair of end portions, defining open ends, at least one of said end portions being formed with a plurality of slots; a radial flange formed in the tube adjacent said one end portion, said flange having an inner surface; an annular seal having an outer surface complementary with the inner surface of the radial flange, and seated in said flange; the annular seal being generally W-shaped in cross section and having a bottom, a top and a pair of tapered sides; the top including at least one convexity and at least one flat portion in communication with one another, and at least one blade extending from the flat portion toward central axis of the tube; and an annular clamp encircling the slots;

providing a second metal tube with an end;

inserting a section of the second metal tube into the open end of the coupler so that the end of the second metal tube is situated adjacent the annular seal opposite the slots; and tightening the clamp.

* * * * *

UNITED STATES PATENT AND TRADEMARK OFFICE
CERTIFICATE OF CORRECTION

PATENT NO.    : 6,843,516 B2
DATED         : January 8, 2005
INVENTOR(S)   : Bishop et al.

It is certified that error appears in the above-identified patent and that said Letters Patent is hereby corrected as shown below:

Column 6,
Line 43, change the word "stem" to the word -- system -- so it reads "A coupler for a low pressure system, said coupler"

Column 7,
Line 60, replace the word "tong" with the word -- long -- so it reads "at least one blade extending from the long parallel side of "

Column 8,
Line 25, change "claim 18" to -- claim 19 -- so it reads "The coupler as defined in claim 19 u which the the hollow"
Line 31, replace the "paid" with the word -- said -- so it reads "least one of said end portions being formed with a"
Line 40, add the words -- the top -- before the word "including" so it read "the top including a pair of rounded portions and an intermediate"
Line 48, add the word -- at -- before the word "least" so it reads "The coupler as defined in claim 22 in which the at least"

Column 9,
Line 38, change the paragraph with the following paragraph -- an annular seal having an outer surface complementary with the inner surface of the radial flange, and seated in said flange; the annular seal being generally W-shaped in cross section and having a bottom, a top and a pair of tapered sides; the top including a pair of rounded portions and an intermediate concavity, each rouneded portion communicating with the intermediate concavity and with one of the tapered sides; at least one hollow interior Being formed in the seal adjacent each rounded portion; the bottom including a pair of flat portions and an intermediate concavity, each flat portion communicating with the intermediate concavity of the bottom and one of the tapered sides; and --

UNITED STATES PATENT AND TRADEMARK OFFICE
CERTIFICATE OF CORRECTION

PATENT NO. : 6,843,516 B2
DATED : January 8, 2005
INVENTOR(S) : Bishop et al.

It is certified that error appears in the above-identified patent and that said Letters Patent is hereby corrected as shown below:

<u>Column 10,</u>
Line 11, add the word -- in -- after the words "claim 32" so it reads "The coupler as defined in claim 32 in which at least one"

Signed and Sealed this

Thirty-first Day of May, 2005

JON W. DUDAS
*Director of the United States Patent and Trademark Office*